United States Patent
Daniel-Ivad et al.

(10) Patent No.: US 7,008,723 B2
(45) Date of Patent: Mar. 7, 2006

(54) METHOD OF MANUFACTURE OF AN ANODE COMPOSITION FOR USE IN A RECHARGEABLE ELECTROCHEMICAL CELL

(75) Inventors: Josef Daniel-Ivad, Newmarket (CA); James R. Book, Toronto (CA); Elfriede Daniel-Ivad, Newmarket (CA)

(73) Assignee: Ecosol Solar Technologies Inc., Ottawa (CA)

( * ) Notice: Subject to any disclaimer, the term of this patent is extended or adjusted under 35 U.S.C. 154(b) by 371 days.

(21) Appl. No.: 09/933,125

(22) Filed: Aug. 21, 2001

(65) Prior Publication Data

US 2003/0068549 A1    Apr. 10, 2003

(51) Int. Cl.
*H01M 4/26* (2006.01)
*H01M 4/42* (2006.01)
*H01M 10/28* (2006.01)

(52) U.S. Cl. .................. 429/206; 429/229; 429/212
(58) Field of Classification Search ........ 429/229–231, 429/206, 212, 215
See application file for complete search history.

(56) References Cited

U.S. PATENT DOCUMENTS

| | | | |
|---|---|---|---|
| 5,424,145 A | * | 6/1995 | Tomantschger et al. ...... 429/57 |
| 5,626,988 A | | 5/1997 | Daniel-Ivad et al. |
| 6,099,987 A | | 8/2000 | Daniel-Ivad et al. |

* cited by examiner

*Primary Examiner*—Jonathan Crepeau
(74) *Attorney, Agent, or Firm*—Santosh K. Chari; Blake, Cassels & Graydon LLP

(57) ABSTRACT

The invention described herein is directed to a method of manufacturing an anode composition for use in an electrochemical cell, in which the anode comprises an electrochemically active material, the method comprising the steps of mixing the electrochemically active material with an alkaline electrolyte solution, an organic surfactant, an indium compound, and a gelling agent, such that the indium compound or a portion thereof is added in an alkaline environment.

24 Claims, 2 Drawing Sheets

METHOD OF MANUFACTURE OF AN ANODE COMPOSITION FOR USE IN A RECHARGEABLE ELECTROCHEMICAL CELL

FIELD OF THE INVENTION

This invention relates to a method of manufacturing an anode composition for use in a sealed rechargeable cell.

BACKGROUND OF THE INVENTION

Rechargeable galvanic cells comprise a cathode, a zinc anode, a separator having at least one layer of a semi permeable membrane and an aqueous alkaline electrolyte, such as an aqueous solution of potassium hydroxide. The cathode may comprise manganese dioxide, hydrogen recombination catalysts, hydrogen absorbers, or an air electrode. Graphite and/or carbon black is admixed to the cathode materials to provide electronic conductivity and alkaline electrolyte is admixed to provide ionic conductivity. The zinc anode mixture will include zinc or a zinc alloy as one of the main constituents, and will also include electrolyte and other constituents in known manner. These cells display superior electrical performance, in particular at high discharge rates and at low temperatures, and are widely used in many applications.

In contrast to rechargeable galvanic cells, primary galvanic cells are only discharged once and then discarded. Therefore, the performance requirements or expectations of primary and rechargeable cells are fundamentally distinct. Primary cells are expected to exhibit low self-discharge rates and satisfy demanding performance requirements. Rechargeable cells, on the other hand, are expected to demonstrate good cycle life and cumulative performance. Both types are expected to show low rates of gassing, however, the mechanisms affecting gassing are very different in rechargeable cells as gassing is measured over many recharge cycles, which alters the states of the electrodes many times. The recharge process of zinc electrodes is particularly troublesome due to zinc redistribution and the high solubility of the zinc electrode discharge product in strong alkaline electrolytes. These factors contribute to or cause observed shape changes, poorer cycle life, gassing and formation of dendrites. As a result, it has been very difficult to produce sealed rechargeable cells with zinc electrodes without providing a resealable venting mechanism that would release excessive gassing during cycling and storage. It would be, therefore, not feasible to attempt to predict the effect of a change in, for example, electrode make-up, on the performance of a rechargeable cell from the effect of such a change on the performance of primary cells.

Because of environmental concerns regarding disposal of batteries, toxic additives in manganese/zinc cells such as mercury and lead are being drastically reduced or eliminated from the cells. U.S. Pat. No. 5,626,988 describes in its background how the addition of mercury provides inhibition of zinc corrosion, resultant hydrogen gassing and electrolyte leakage. It also describes how mercury provides conductivity in the anode resulting in superior electrical performance, in particular at high discharge rates, at low temperature and under conditions where the cells are exposed to mechanical shock and vibration. It further describes the use of surfactants and various metals including indium, for inhibiting corrosion and preventing dendrite formation in rechargeable cells.

Also described is known art relating to primary or single use galvanic cells regarding the problem of the surface coating of zinc powders with appropriate metals or their compounds, prior to processing the negative electrode, many of the techniques being complicated and frequently requiring washing and drying steps.

U.S. Pat. No. 5,626,988 further describes a sealed rechargeable cell containing a mercury-free zinc anode and a method of manufacture, which includes treating a zinc or zinc alloy powder with indium sulfate, and more particularly with both an organic surfactant and electrolyte. The zinc powder is coated with a surfactant, and separately with an acidic aqueous solution of indium sulfate. Without any subsequent filtering, washing or drying, the powder is mixed with electrolyte and gelling agent and assembled into the cell.

SUMMARY OF THE INVENTION

In one broad aspect of this invention is a method of manufacturing an anode composition for use in a rechargeable electrochemical cell, wherein the anode comprises an electrochemically active material, the method comprising the steps of:
(a) mixing said material with a first portion of an alkaline electrolyte solution;
(b) mixing said material with an organic surfactant;
(c) mixing said material with a first indium compound;
(d) mixing to said material a second portion of said electrolyte and a gelling agent.

In another broad aspect of this invention is a method of manufacturing an anode composition for use in a rechargeable electrochemical cell, wherein the anode comprises an electrochemically active material, the method comprising the steps of:
(a) mixing said material with an organic surfactant;
(b) mixing said material with a first indium compound;
(c) mixing said material with a first portion of an alkaline electrolyte solution;
(d) mixing said material with a second indium compound; and
(e) mixing to said material a second portion of said electrolyte and a gelling agent.

This invention also contemplates a rechargeable cell comprising an anode having the composition manufactured in accordance with the method described herein; a cathode, an electrolyte; and a separator between the anode and the cathode.

DESCRIPTION OF THE PREFERRED EMBODIMENTS

Figure 1:
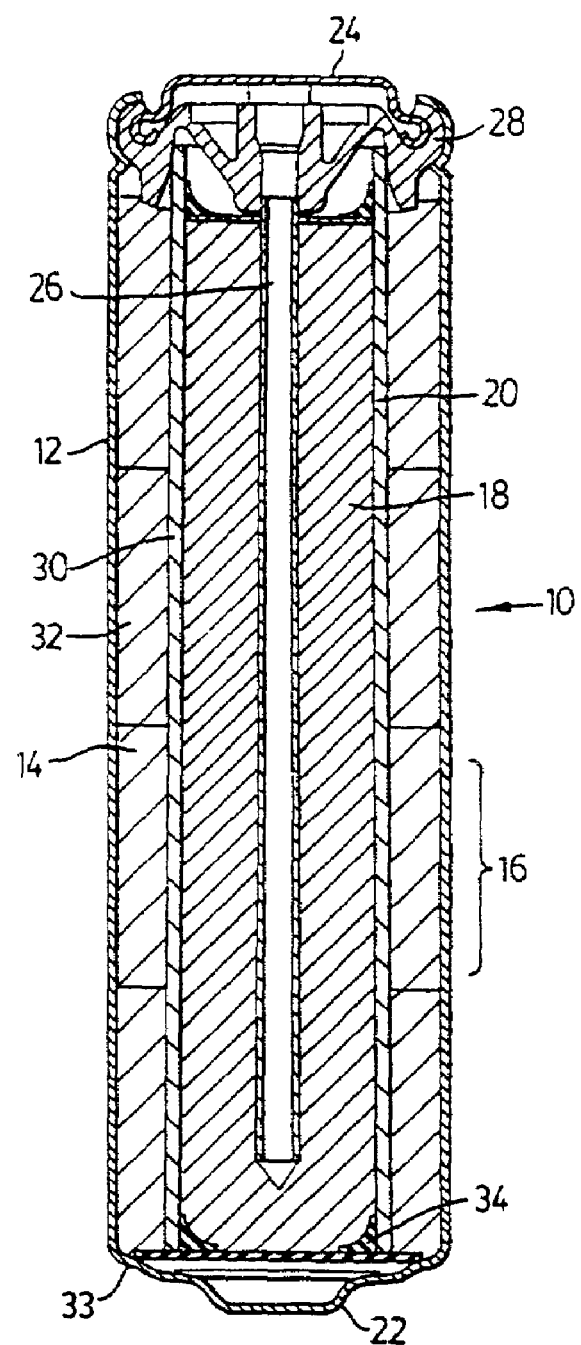
FIG. 1 is a cross-sectional elevation of a typical cylindrical cell as known in the prior art.

As shown in FIG. 1, a typical alkaline manganese dioxide-zinc rechargeable cell comprises the following main units: a steel can 12, optionally coated with a conductive coating on the inside of the can, defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide, KOH, electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The material of separator 20 consists of two different materials, i.e.: a first material made of fibrous sheet material wettable by the electrolyte, and a second material being impermeable to small particles but retaining ionic permeability. An expedient material for the first layer is a sheet material of non-woven polyamide fiber, which is absorbent and serves as a reservoir for electrolyte. The macro-porous structure of the absorbent layer cannot prevent internal shorting by zinc dendrites or deposits during discharge/charge cycling.

Shorting is prevented by the second material, which may be a layer or layers of micro-porous or non-porous material laminated to or coated onto the fibrous sheet material. One suitable material is one or more cellophane membranes laminated to the non-woven polyamide sheet. Another is one or more coatings of regenerated cellulose or viscose coated onto and partially impregnating the non-woven polyamide sheet, resulting in a composite material.

One or more layers of the laminated or composite material are wound to form a cylindrical tube and placed into the hollow cylindrical cathode structure.

As illustrated in FIG. 1, one prior art method of achieving sealing of the separator bottom is by means of a hot-melt bead 34, which was used to seal the separator 20 to a washer 33 in the cell. In another variation the washer is omitted and hot-melt adhesive only is used.

Figure 2:
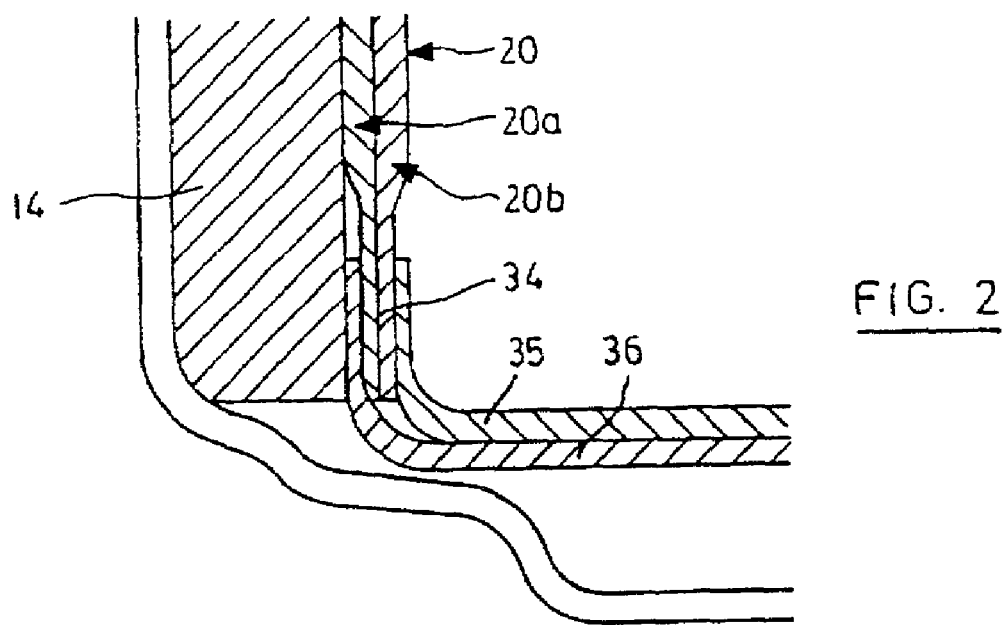
FIG. 2 is an enlarged cross-sectional view of the bottom portion of the cell as shown in FIG. 2 of earlier U.S. Pat. No. 6,099,987.

FIG. 2 illustrates a bottom sealing means according to an earlier invention described in U.S. Pat. No. 6,099,987. As shown, the sealing of the bottom of the separator 20 is achieved in that invention by two cups 35 and 36, placed around and inside the bottom of the separator. As mentioned above, the separator 20 is preferably comprised of two layers, shown as 20a and 20b. The cup or cups, 35 and 36, are made of a material comprising one or more thin microporous or non-porous membranes laminated or coated onto one or more sheets of non-woven fibrous porous sheet material. During placement, the non-woven fibrous materials of the separator and the cup or cups are compressed in the overlap area 34 where the cup and/or cups overlap the bottom of the separator 20. Any gaps between the separator and cup or cups formed by the wrinkling of the thin micro-porous or non-porous layers are filled by the compressed fibers of the porous non-woven layers resulting in an effective barrier to internal short circuits. This is accomplished by selection of the material in the cups and the shape and dimensions of the tools used to make the placement of the cups and the separator into the hollow cathode cylinder.

In accordance with the present invention, the anode comprises of zinc as the electrochemically active material. The zinc may be a mercury-free or mercury-free and lead-free zinc or zinc alloy. The mercury-free or mercury-free and lead-free zinc or zinc-alloy may be metallic, a powder, granular, particulate, or in the form of flakes but are not limited to these forms. The metallic zinc powder preferably has a purity of 99.98%, while the zinc alloy powder preferably comprises 99% zinc. Up to about 20% by weight of solid zinc oxide may be incorporated into the active material of the anode. The zinc alloy may comprise of mercury-free and lead-free zinc-bismuth alloy, mercury-free and lead-free zinc-bismuth alloy of finer particle size, zinc-lead alloy, zinc-aluminum-bismuth-indium alloy, zinc-calcium-bismuth-indium alloy, zinc-magnesium-bismuth alloy, and any combination thereof. The zinc may contain up to 800 ppm lead, up to 800 ppm indium, up to 500 ppm calcium, up to 500 ppm magnesium, up to 200 ppm bismuth and up to 200 ppm aluminum.

In a first broad aspect of the invention, the electrochemically active material comprises a mercury-free or mercury-free and lead-free zinc or zinc alloy, which is first mixed with a first portion of an alkaline electrolyte. The electrolyte is preferably potassium hydroxide, the first portion of which is usually added to about 40% of the total electrolyte volume. This ratio is, however, not critical as a 100% of the electrolyte can be applied in the first step, providing the blending system or equipment can produce a lump free pumpable anode gel. It has been determined however, that a preferable range for the first portion of the electrolyte is between about 20% to about 60% of the total volume of electrolyte with about 40% being the most preferable. The zinc is then mixed with an organic surfactant or wetting agent. A wetting agent or surfactant is effective in minute concentrations and should be stable in the alkaline electrolyte. The preferred surfactants for rechargeable cells are selected from the group of nonionic and ionic surfactants having a molecular weight of from about 300 to about 1500, and more particularly are compounds containing polyethylene oxide or polypropylene oxide groups, their copolymers or any combination thereof. Particularly suitable surfactants include polyoxypropylene compounds, polyoxythelene compounds, their copolymers or any combination thereof. The materials are thoroughly mixed to assure complete mixing of the zinc if surfactant is added at this stage. The zinc is then thoroughly mixed with a first indium compound. The indium compound is preferably indium sulfate either in the form of a solution or powder. The indium compound can also be indium oxide, indium hydroxide or indium acetate. The indium compounds used can be either in the form of a solution or a powder. This step is then followed by the addition and thorough mixing of the remainder of the alkaline electrolyte and a gelling agent. This last step can include the addition of nucleation additives such as magnesium oxide, magnesium hydroxide, calcium oxide, calcium hydroxide, zirconium oxide and any combination thereof The nucleation additives can also be added directly to the electrochemically active material before any of the steps described herein.

Nucleation additives function as precipitation aids for zinc oxide during discharge and zinc during the charging process. This results in a better morphology of the rechargeable zinc anode, which can improve performance and lower gassing.

The steps described above need not be carried out strictly in the sequential order described above. Some of the steps can be carried out simultaneously with the proviso that the indium compounds are added in an alkaline environment and lead to an anode composition which provides for a better performance rechargeable cell.

Thus, in another aspect, the addition of the organic surfactant can precede the addition of the first portion of the alkaline electrolyte.

In another aspect, the addition of organic surfactant can precede the addition of the first portion of the alkaline electrolyte and the addition of the first indium compound is then followed by the addition of a second indium compound. If the first indium compound is indium sulfate, the second indium compound can be indium sulfate, indium oxide, indium hydroxide, or indium acetate. The first and second indium compound can be in the form of a solution or in the form of a powder or a combination thereof.

In another aspect, the organic surfactant and the first indium compound can be added simultaneously.

In another aspect, the addition of the organic surfactant can precede the addition of the first portion of the alkaline electrolyte and the addition of the alkaline electrolyte and first indium compound can be added simultaneously.

In another aspect, the addition of the first and second indium compound can be performed simultaneously. Alternatively, the first and second indium compounds can be added simultaneously with the organic surfactant.

In a second broad aspect of the invention, the electrochemically active material comprises a mercury-free or mercury-free and lead-free zinc or zinc alloy, which is first mixed with an organic surfactant or wetting agent. The preferred surfactants for rechargeable cells are selected from the group of nonionic and ionic surfactants having a molecular weight of from about 300 to about 1500, and more particularly are compounds containing polyethylene oxide or polypropylene oxide groups, their copolymers or any combination thereof. Particularly suitable surfactants include polyoxypropylene compounds, polyoxythelene compounds, their copolymers or any combination thereof. This step is followed by the addition of a first indium compound. The first indium compound may comprise indium sulfate, indium oxide, indium hydroxide or indium acetate and can be either in the form of a solution or a powder. The electrochemically active material is next mixed with a first portion of an alkaline electrolyte solution. The alkaline electrolyte solution is preferably potassium hydroxide and is preferably added in an amount of about 40% of the total volume of the electrolyte to be added. This ratio is, however, not critical as a 100% of the electrolyte can be applied in the first step, providing the blending system or equipment can produce a lump free pumpable anode gel. It has been determined however, that a preferable range for the first portion of the electrolyte is between about 20% to about 60% of the total volume of electrolyte. A second indium compound is next added to the composition. The second indium compound may be either indium sulfate, indium oxide, indium hydroxide, or indium acetate and can be either in the form of a solution or a powder. Finally, this step is followed by the addition of the remainder of the alkaline electrolyte and a gelling agent. This last step can include the addition of nucleation additives such as magnesium oxide, magnesium hydroxide, calcium oxide, calcium hydroxide, zirconium oxide and any combination thereof. The nucleation additives can also be added directly to the electrochemically active material before any of the steps described herein. In all of the steps the electrochemically active material is thoroughly mixed to ensure complete and homogeneous mixing of each component added.

The steps described need not be carried out strictly in the sequential order described above. Some of the steps, for example, can be carried out simultaneously with the proviso that anode composition results in rechargeable cell which provide better performance. For example, in one embodiment, the addition of the first indium compound can be added simultaneously with the organic surfactant. The anode composition prepared by the embodiments described herein need no further treatment such as washing and drying before being assembled into the cells.

A gelled zinc anode manufactured by the method described herein can be used in rechargeable alkaline manganese dioxide/zinc galvanic cells. These cells can be assembled in cylindrical, button, coin or prismatic formats. Zinc anodes manufactured by the method of the present invention typically contain 1.43 to 2.4 grams of zinc powder per $cm^3$ of gel.

In the case of rechargeable cells using pasted or flat electrodes, depending on whether the cell is assembled in the charged or discharged state, there can be a ratio of zinc to zinc oxide of from 10/90 (discharged state) to 100/0 (fully charged state). The aqueous electrolyte is usually 25% to 40% potassium hydroxide, optionally with zinc oxide dissolved in it up to saturation. The negative electrode is processed by kneading the zinc/zinc oxide powder mixture with 4% to 10% colloidal PTFE suspension by weight of zinc, and the paste is subsequently applied to at least one side of a current collector by e.g. a rolling process followed by an optional pressing step.

A variety of cathode materials can be used with the anode 18 of the present invention. The cathode active materials may comprise one of manganese dioxide, manganese oxyhydroxide, bismuth modified manganese dioxide, silver oxide, nickel oxyhydroxide or oxygen in an air electrode. Electrolytic manganese dioxide is suitable for use in the positive electrode with the zinc electrode of the present invention. Also included with the manganese dioxide is: 4% to 15% by weight of graphite and carbon black to provide conductivity; minor amounts below 1% by weight of a hydrophobic lubricant such as polytetrafluoroethylene, polyethylene or a metal stearate to provide lubricity during processing and facilitate gas penetration into the electrode; the addition of compounds such as barium oxide, hydroxide or sulfate, in the range of 3 to 15% by weight to improve performance during discharge/discharge cycling: and 0.01% to 10% finely divided hydrogen recombination catalyst such as silver or its oxides or hydrogen absorbing alloys such as $LaNi_x$ or $NiTi_y$, to prevent pressure build-up from gassing resulting from corrosion of the zinc: and enough 20% to 40% potassium hydroxide electrolyte solution to substantially fill the pores of the manganese dioxide and the pores between the solid powders of the cathode.

Various examples will now be described. The cells are AA size or IEC LR6, but rechargeable. These have been subjected to various tests as identified, but in all cases the default charge condition is 12 hours voltage-limited taper charge to an end voltage of 1.65 volts.

In each trial four cells were tested on each test. Some anode designs were evaluated in several trials as noted in the tables.

The subject of this disclosure is the anode preparation process. The critical requirements to evaluate the designs are electrical cycling performance and gassing. In the rechargeable alkaline manganese zinc cell design, performance is measured using similar discharge loads and voltage endpoints as primary alkaline manganese zinc cells.

In performance test 1, cells are deep-discharged through a 3.9-Ohm resistor load to 0.80V, then recharged as described above and further discharged and recharged for a total of 25 cycles. This test represents motor/toy applications. Performance in Ah-capacity is reported for the first discharge cycle and cumulative performance in Ah is reported over the 25 cycles.

Performance test 2 is similar to performance test 1, except that the discharge is through a 2.2-Ohm resistor load to 0.8V, representing higher rate applications.

Gassing of rechargeable alkaline manganese zinc cells is necessarily higher than that of primary cells as a result of the recharging and longer service life. It is desirable to keep internal cell pressure below 350 psi, which in the AA size cell design represents below about 9 ml of in-cell gas in order to avoid leakage and provide a suitable factor of safety with respect to cell hardware and the safety vent which is not resealable. The following two tests have been found to be severe and are practical for predicting suitability for consumer use.

In gassing test 1, fresh cells are stored for 2 weeks at 65 C., then deep discharged through 2.2 Ohms to 0.80V and recharged for a total of 5 cycles, then stored for approximately one month at room temperature. The cells are then punctured, the gas collected, measured and reported in ml.

In gassing test 2, cycled cells are stored at high temperature. Cells are first deep discharged through 2.2 or 3.9 Ohms to 0.80V and recharged for a total of 5 cycles, then stored for 1 week at 65 C., then deep discharged and recharged for 5 more cycles, then stored for approximately one month at room temperature. The cells are then punctured, the gas collected, measured and reported in ml.

In the examples given the design of the can, cathode, separator and electrolyte remains the same and only the anode design and process of preparation is changed.

EXAMPLE 1

The zinc used in anode designs A through H is a powder of lead-free zinc containing 133 ppm bismuth, with particle size distribution 19%+60 mesh, 30% −60+100 mesh, 21%−100 +140 mesh, 20%−140+200 mesh, 9%−200+325 mesh and 0.4%−325 mesh. Test result in table 1.

In design A the anode is prepared according to the prior art method described in U.S. Pat. No. 5,626,988. The zinc in the amount of 65% by weight of the anode is mixed with an aqueous solution of polyethylene glycol surfactant of molecular weight 600 in the amount of 0.05% by weight of surfactant to the weight of the gelled anode. The zinc is then mixed with an aqueous solution of indium sulfate in the amount of 0.1% indium by weight to the weight of zinc in the anode. A portion of the electrolyte is then added and mixed. Carbopol gelling agent is then added in the amount 0.054% by weight to the weight of the anode and mixed. The remaining electrolyte is then added in an amount to provide a total weight of electrolyte of 33% by weight to the weight of the anode. The performance and gassing results of the other designs in example 1 are compared to the results of this control design and process.

In design B the anode constituents are the same as in design A. However, in anode design B, the order in which the constituents are mixed differ from that in anode design A. In design B, a first portion of the electrolyte is added and mixed first followed by the surfactant and then the indium sulfate solution. A second portion of the electrolyte is next mixed together with the gelling agent. The first portion is typically chosen at the 40% level of the total of first and second portion of electrolyte. This ratio is not critical for the purpose of this invention, as all the electrolyte could be applied as the first portion (100%), provided the blending system or equipment can produce a lump free pumpable anode gel. However, it was determined that a preferable range for first electrolyte is between 20 and 60%, most preferably 40%, which was used for the examples of this application. The performance of this design is 1 to 9% higher than design A and the gassing is similar or less. The alkaline plating process created by adding electrolyte before the surfactant and indium sulfate solution provides benefits.

In design C the anode constituents are the same as in design B, but the surfactant is mixed with the zinc before the addition of any electrolyte and the indium sulfate solution is added after addition of the first portion of electrolyte. The addition of indium sulphate is followed by the addition of a second portion of the electrolyte and the gelling agent. The performance of this design is on average lower than designs A and B, and gassing is somewhat higher as well, but still within an acceptable level of gas as required by the cell hardware. There does not appear to be any benefit in mixing the zinc with surfactant before the addition of electrolyte.

Design D is similar to design B except that solid indium oxide powder is used in place of indium sulfate solution in an amount to provide 0.1% indium by weight to the weight of zinc in the anode. Performance of this design is 6 to 13% higher than control group A and better than group B as well. However, this benefit is offset by gassing that is up to four times that of designs A and B, but is still within the acceptable level of gas determined by the cell hardware.

Design E is similar to design D except that the amount of indium oxide used provided 0.2% indium by weight to the weight of zinc in the anode, double that of design B. Performance of this design is on average about the same as design D and gassing is lower than design D but still higher than designs A and B. In primary alkaline cells, amounts of indium of 0.10% to zinc or higher are typically avoided as a gassing inhibitor because of undesirable effects on performance, but in this rechargeable alkaline cell design there is a demonstrated benefit in the higher levels of indium, both for gassing and performance.

In design F, the anode constituents are the same as in design D, but the surfactant is mixed with the zinc before the addition of any electrolyte and the indium oxide powder is mixed in after the addition of the first portion of electrolyte. A second portion of the electrolyte is then mixed together with the gelling agent. In this design, performance is much better than design A but there is no benefit to performance versus design D and gassing is slightly higher. Of these two process designs, mixing in the surfactant and indium oxide after the electrolyte is better.

Design G is similar to design B and D except that 0.02% of the total indium is mixed in as indium sulfate solution after the first portion of electrolyte, and 0.08% of the total indium is mixed in as indium oxide powder after the addition of the indium sulfate solution. Performance is much higher than design A, and similar to design D. Gassing is higher than design A and similar to design D. The use of indium sulfate solution to provide 0.02% of the indium does not seem to have the desired effect of moderating the gassing.

Design H is similar to design G except that 0.05% of the total indium is mixed in as indium sulfate solution and 0.05% of the total indium as indium oxide powder. Performance is 1 to 6% higher than design A, but up to 6% lower than design D. Gassing is up to 3 times higher than design A and about two thirds of design D. The use of indium sulfate solution to provide one-half of the indium does have the desired effect of moderating the gassing, offset by a slight decrease in performance.

This example demonstrates the principle that rechargeable performance can be increased and gassing controlled by means of anode designs and processes where the organic surfactant and indium compound inhibitors is added after the zinc is mixed with electrolyte, or partly before and partly after the zinc powder is mixed with electrolyte. It also demonstrates that the choice of indium compound and when it is added during the process is important with respect to performance enhancement and the management of gassing.

EXAMPLE 2

The zinc powder used in anode designs J through P is lead-free zinc containing 133 ppm bismuth as in example 1, but of a much finer particle size. The particle size distribution is 10% +60 mesh, 19%−60+100 mesh, 18%−100+140 mesh, 18%−140+200 mesh, mesh and 19%−325 mesh. Test results appear in table 2.

Anode design J is prepared in the same manner as design A of example 1 and serves as the prior art control design to which the other designs of this example are compared. It gives higher first discharge performance than design A, but similar or lower cumulative performance over 25 cycles. Gassing is a little higher than design A, but at a low level.

In design K, the surfactant and indium sulfate are mixed in after a portion of the electrolyte as in design B after which a second portion of the electrolyte together with the gelling agent is added and mixed. The alkaline plating process created by adding electrolyte before the surfactant and indium sulfate solution provide little performance benefit in this case but some benefit in reduced gassing.

Design L is prepared as in design D with surfactant and indium oxide powder added after electrolyte. Similar to the results in design D, cumulative performance is greatly enhanced, in this case by 13% on test 1 and 7% on test 2. Gassing is 1.5 to 2 times that of design J, but this increase is less than that of design D versus design A.

Design M is prepared in a similar way to design L, except that indium hydroxide powder is used in place of indium oxide powder. Compared to control design J, performance is similar or lower and gassing is similar or a little higher. Compared to design L with indium oxide, performance is lower and gassing the same or lower. There seemed to be no advantage to mixing indium hydroxide with the zinc of this example.

In design N the surfactant is mixed with the zinc. Then, 0.02% of indium to zinc is mixed into the zinc as indium sulfate solution. The zinc is then mixed with a first portion of the electrolyte. 0.08% of indium to zinc is next added and mixed in as indium sulfate solution followed by the remainder of the electrolyte and together with the gelling agent. Compared to design J where the surfactant and all of the indium sulfate is added before any electrolyte, performance is a little higher and gassing is a little lower. Compared to design K, where the surfactant and all of the indium sulfate solution is added after a portion of the electrolyte, performance and gassing are similar.

Design P is prepared similarly to design N, except that 0.05% indium to zinc is added and mixed as indium sulfate solution before any electrolyte and 0.05% indium to zinc is added and mixed as indium sulfate solution after a first portion of the electrolyte. Performance is similar to that of the control design J and gassing is somewhat lower. Compared to design K, performance and gassing are similar.

This example demonstrates the performance improvement achieved by mixing the indium compound, particularly indium sulfate after mixing in the zinc with a first portion of the electrolyte. It further demonstrates the possibility of reducing gassing by mixing a first portion of indium sulfate solution before any electrolyte and the second remaining portion of indium sulfate solution after mixing a first portion of the electrolyte.

EXAMPLE 3

The zinc powder used in anode designs Q through V is zinc containing 400–550 ppm lead. The particle size distribution is 22%+60 mesh, 34%−60+100 mesh, 22%−100+140 16%−140+200 mesh, 6%−200+325 mesh. Test results appear in table 3.

Anode design Q is prepared in the same manner as design A of example 1 and serves as the prior art control design to which the other designs of this example are compared. It gives higher first discharge performance than design A, but lower cumulative performance over 25 cycles. Gassing is at a low level.

In design R, the surfactant and indium sulfate are added and mixed after a first portion of the electrolyte as in design B. This is then followed by the addition and mixing of a second portion of the electrolyte and a gelling agent. The alkaline plating process created by the mixing in of the first portion of the electrolyte before the surfactant and indium sulfate solution provide 10% and 3% benefits in cumulative performance. Gassing is increased up to double the low levels of the control design Q.

Design S is prepared as in design D with surfactant and indium oxide powder added and mixed after a first portion of the electrolyte. This is then followed by the mixing and addition of a second portion of the electrolyte and a gelling agent. Similar to the results in design D, cumulative performance is greatly enhanced, in this case by 8% on test 1 and 16% on test 2. Gassing is lower on test 1 but 3 times that of design Q on test 2.

Design T is prepared in a similar way to design M, using indium hydroxide powder in place of indium oxide powder. Compared to the control design Q, both first discharge and cumulative performance are higher and gassing is lower in test 1 and 3 times higher in test 2. Compared to design S with indium oxide, performance is lower and gassing is similar. Contrary to design M of example 2 above, with this zinc there is a performance benefit in using indium hydroxide instead of indium sulfate but not as much benefit as when using indium oxide.

In design U, the surfactant is mixed with the zinc powder. 0.02% of indium to zinc is next mixed into the zinc as indium sulfate solution. The zinc is then mixed with a first portion of the electrolyte. 0.08% of indium to zinc is then added and mixed as indium oxide powder followed by a second portion of the electrolyte and the gelling agent. Compared to design Q, where the surfactant and all of the indium as indium sulfate is added before any electrolyte, performance on first discharge is similar and cumulative performance is 18% and 5% higher. However, gassing is about 3 times higher. Compared to design S where the surfactant and all of the indium oxide powder is mixed in after a first portion of the electrolyte, performance is not quite as high, but surprisingly gassing with this zinc is 4 times higher on one test and similar on the other.

Design V is prepared similarly to design U, except that 0.05% indium to zinc is added and mixed in as indium sulfate solution before any electrolyte and 0.05% indium to zinc is mixed in as indium oxide powder after a portion of the electrolyte. Cumulative performance is 13% higher on test 1 and similar on test 2 versus that of the control design Q and gassing is 2 to 3 times higher. Compared to design S, where the surfactant and all of the indium oxide powder is added and mixed in after a portion of the electrolyte, performance is not quite as high, but surprisingly gassing with this zinc is two and a half times higher on one test and similar on the other.

This example, carried out with leaded zinc alloy, further demonstrates the benefit to performance of mixing to this zinc-lead alloy, surfactant and indium compound, particularly indium oxide and, indium hydroxide after mixing the zinc-lead alloy with electrolyte. It further demonstrates that gassing of the zinc can be managed by mixing part of the indium in an acid environment before adding electrolyte and mixing in the remaining indium in an alkaline environment after adding electrolyte.

EXAMPLE 4

The zinc powder used in anode designs W through Z is zinc alloy containing 104 ppm aluminum, 119 ppm bismuth, 200 ppm indium. The particle size distribution is 20%+60 mesh, 35%−60+100 mesh, 23%−100+140 mesh, 17%−140+200 mesh, 6%−200+325. Test results appear in table 4. As the zinc alloy contains 200 ppm indium or 0.02%, the indium added in the anode preparation process is reduced to 0.08% to zinc to provide a total of 0.10% indium to zinc by weight in the anode.

Anode design W is prepared in the same manner as design A of example 1 and serves as the prior art control design to which the other designs of this example are compared. It gives similar first discharge performance to design A, but much lower cumulative performance over 25 cycles. Gassing is at a low level, somewhat lower than that of design A.

In design X, the surfactant and indium sulfate are added and mixed in after a portion of the electrolyte as in design B. The alkaline plating process created by mixing the electrolyte before the surfactant and indium sulfate solution provides a 7% benefit in cumulative performance. Gassing is similar to the low levels of the control design W.

In design Y, as in design N, the surfactant is mixed with the zinc powder. 0.016% of indium to zinc is next mixed into the zinc as indium sulfate solution. The zinc is then mixed in with a first portion of the electrolyte. 0.064% of indium to zinc is then mixed in as indium sulfate solution. This step is followed by the addition and mixing of the second portion of the electrolyte and the gelling agent. Compared to design W, where the surfactant and all of the indium sulfate is mixed in before any electrolyte, first discharge performance is 8% and 6% higher and cumulative performance is a little lower on one test and a little higher on the other. Gassing is higher but still at a low level. Compared to design X where the surfactant and all of the indium sulfate solution is mixed in after a portion of the electrolyte, first discharge performance is higher but cumulative performance is lower. Gassing is higher but still at a low level. Similar to design U, in design Z the surfactant is mixed with the zinc. Then 0.016% of indium to zinc is mixed into the zinc as indium sulfate solution. The zinc is then mixed with a first portion of the electrolyte. 0.064% of indium to zinc is next added and mixed in as indium oxide powder. This is then followed by the addition and mixing of the gelling agent and a second portion of the electrolyte. Compared to design W where the surfactant and all of the indium is mixed in as indium sulfate before any electrolyte, first discharge performance is 3% and 9% higher and cumulative performance is 9% and 5% higher. Gassing is 4 times higher on test 1 but at a tolerable level, and lower on test 2. Compared to design Y where indium sulfate solution instead of indium oxide is mixed in after the electrolyte, first discharge performance is lower on one test and similar on the other, but cumulative performance is 11% higher on one test and similar on the other. Gassing is higher on one test, lower on the other, but still at a tolerable level.

This example demonstrates that even with zinc containing other metals such as aluminum, bismuth and indium, as corrosion inhibitors and for other purposes, a combination of choice of indium compounds and the order of mixing in the anode composition process can be used to improve cell performance and manage zinc gassing.

EXAMPLE 5

This example uses the same zinc as in example 1, except that nucleation additives are added during the process as well. The nucleation additives can be added directly to the zinc before the first portion of the electrolyte or with the gelling agent. In this example the nucleation additive was added before the first electrolyte. Test results appear in table 5.

Anode design A of example 1 serves as the prior art control in this comparison. Also, design B and D of example 1 are listed for reference. The performance and gassing results of the other designs in example 5 is compared to the results of the control design A.

Design BB is similar to design B except that 0.5% magnesium oxide by weight of anode is mixed in as nucleation agent during the anode preparation process. Performance of this design over 25 cycles is similar to 3% better than prior art control design A, but the gassing is only half on gassing test 1 and lower on gassing test 2. Compared to design B, the cumulative performance is about the same, but gassing is lower.

Design BC is similar to design B and BB except that a higher amount of 1% magnesium oxide by weight of anode is added and mixed in as nucleation agent during the anode preparation process. Performance of on initial discharge is similar to 9% lower than design A, but over 25 cycles cumulative this design showed already a 5 to 6% benefit and the gassing is much lower as well. Compared to design B, the cumulative performance is about the same, but gassing is lower.

Design DD is similar to design D except that 0.05% magnesium oxide by weight of anode is mixed in as nucleation agent during the anode preparation process. Performance of this design over 25 cycles is 15 to 23% better than prior art control design A, but the gassing is only half on gassing test 1 and lower on gassing test 2. Compared to design D, performance is 2 to 15% better with much reduced gassing.

Design BE is similar to design B except that 0.05% calcium oxide by weight of anode is added and mixed in as nucleation agent during the anode preparation process. Performance of this design over 25 cycles is similar to 11% better than prior art control design A and gassing is lower. Compared to design B, performance is similar to 6% better with lower gassing levels.

Design DF is similar to design D except that 0.05% calcium oxide by weight of anode is added and mixed in as nucleation agent during the anode preparation process. Performance of this design over 25 cycles is 12 to 15% better than prior art control design A, but gassing is higher than design A. Compared to design D, performance is similar to 5% better with only half the gassing on gassing test 1 and somewhat lower gassing on test 2.

Design BG is similar to design B except that 0.05% calcium hydroxide by weight of anode is mixed in as nucleation agent during the anode preparation process. Performance of this design over 25 cycles is 4 to 8% better than prior art control design A and gassing is lower. Compared to design B, performance is 3% better with somewhat lower gassing levels.

Design BH is similar to design B and BG except that a higher amount of 0.5% calcium hydroxide by weight of anode is mixed in as nucleation agent during the anode preparation process. Performance of this design over 25 cycles is similar to 11% better than prior art control design A and gassing is lower. Compared to design B, performance is similar to 6% better with lower gassing levels.

This example demonstrates that the use of nucleation additives can be advantageously applied in this anode process to improve cell performance and manage zinc gassing.

The 5 examples together demonstrate in rechargeable alkaline manganese zinc cells a means of maximizing performance and managing gassing to a tolerable and safe level with zinc powders containing various alloying metals and of various particle size distributions by a choice of indium compounds and the order in which surfactant and indium compounds are mixed in during manufacture of the anode composition, which manufacture requires no subsequent washing, rinsing, drying or other steps before being assembled into cells.

The polyethylene glycol surfactant used is soluble in water but insoluble in the concentrated potassium hydroxide electrolyte. Indium sulfate is soluble in water but only slightly soluble in the electrolyte. Indium oxide and hydroxide are even less soluble than indium sulfate. The most efficient and effective method of applying these organic and metallic corrosion inhibitors and mixing the zinc with surfactant and then mixing with indium by cementation is by using aqueous solutions of surfactant and indium sulfate to mix the zinc before mixing of any alkaline electrolyte. Surprisingly, as demonstrated by the examples above, performance can be enhanced and gassing in rechargeable cells can still be managed to a suitable level by mixing part or all of the inhibitors after mixing in of electrolyte.

TABLE 1

Lead-free zinc-bismuth alloy

| Anode Design | No. of trials | Order of addition of Zn, PEG, indium compound and electrolyte (KOH) | Performance Test 1 | | | | Performance Test 2 | | | | Gassing Test 1 Average ml | Gassing Test 2 Average ml |
|---|---|---|---|---|---|---|---|---|---|---|---|---|
| | | | Cycle 1 Ah | % vs Control- | Cycle 25 Cumulative Ah | % vs Control | Cycle 1 Ah | % vs Control- | Cycle 25 Cumulative Ah | % vs Control | | |
| A | 9 | Zn, PEG, In2(SO4)3, KOH [Prior Art] | 1.57 | | 18.97 | | 1.24 | | 15.40 | | 1.8 | 2.5 |
| B | 6 | Zn, KOH, PEG, In2(SO4)3 | 1.58 | 1% | 19.20 | 1% | 1.35 | 9% | 16.23 | 5% | 1.9 | 2.0 |
| C | 1 | Zn, PEG, KOH, In2(SO4)3 | 1.56 | −1% | 17.63 | −7% | 1.31 | 6% | 15.14 | −2% | 3.4 | 1.9 |
| D | 4 | Zn, KOH, PEG, In2O3 | 1.70 | 8% | 21.49 | 13% | 1.31 | 6% | 16.60 | 8% | 7.2 | 3.7 |
| E | 1 | Zn, KOH, PEG, In2O3(0.2% In to Zn) | 1.61 | 3% | 20.56 | 8% | 1.38 | 11% | 17.56 | 14% | 4.2 | 3.0 |
| F | 1 | Zn, PEG, KOH, In2O3 | 1.56 | −1% | 20.80 | 10% | 1.34 | 8% | 16.84 | 9% | 7.9 | 5.5 |
| G | 1 | Zn, KOH, PEG, In2(SO4)3 (0.02% In to Zn), In2O3 (0.08% In to Zn) | 1.59 | 1% | 20.33 | 7% | 1.38 | 11% | 16.78 | 9% | 7.7 | 3.5 |
| H | 1 | Zn, KOH, PEG, In2(SO4)3 (0.05% In to Zn), In2O3 (0.05% In to Zn | 1.59 | 1% | 19.26 | 2% | 1.31 | 6% | 16.01 | 4% | 5.2 | 2.4 |

TABLE 2

Lead-free zinc-bismuth alloy, finer particle size

| Anode Design | No. of trials | Order of addition of Zn, PEG, indium compound and electrolyte (KOH) | Performance Test 1 | | | | Performance Test 2 | | | | Gassing Test 1 Average ml | Gassing Test 2 Average ml |
|---|---|---|---|---|---|---|---|---|---|---|---|---|
| | | | Cycle 1 Ah | % vs Control- | Cycle 25 Cumulative Ah | % vs Control | Cycle 1 Ah | % vs Control- | Cycle 25 Cumulative Ah | % vs Control | | |
| J | 2 | Zn, PEG, In2(SO4)3, KOH [Prior Art] | 1.63 | | 17.38 | | 1.34 | | 15.40 | | 2.3 | 3.2 |
| K | 1 | Zn, KOH, PEG, In2(SO4)3 | 1.63 | 0% | 17.82 | 3% | 1.33 | −1% | 15.10 | −2% | 2.6 | 1.8 |
| L | 3 | Zn, KOH, PEG, In2O3 | 1.59 | −2% | 19.66 | 13% | 1.33 | −1% | 16.55 | 7% | 4.6 | 4.8 |
| M | 2 | Zn, KOH, PEG, In(OH)3 | 1.54 | −6% | 16.52 | −5% | 1.30 | −3% | 15.63 | 1% | 2.2 | 4.4 |
| N | 1 | Zn, PEG, In2(SO4)3 (0.02% In to Zn), KOH, In2(SO4)3 (0.08% In to Zn) | 1.70 | 4% | 17.82 | 3% | 1.39 | 4% | 15.03 | −2% | 2.1 | 2.0 |
| P | 1 | Zn, PEG, In2(SO4)3 (0.05% In to Zn), KOH, In2(SO4)3 (0.05% In to Zn) | 1.61 | −1% | 17.87 | 3% | 1.29 | −4% | 15.02 | −2% | 2.4 | 1.8 |

TABLE 3

Zinc-lead alloy

| Anode Design | No. of trials | Order of addition of Zn, PEG, indium compound and electrolyte (KOH) | Performance Test 1 | | | | Performance Test 2 | | | | Gassing Test 1 Average ml | Gassing Test 2 Average ml |
|---|---|---|---|---|---|---|---|---|---|---|---|---|
| | | | Cycle 1 Ah | % vs Control- | Cycle 25 Cumulative Ah | % vs Control | Cycle 1 Ah | % vs Control- | Cycle 25 Cumulative Ah | % vs Control | | |
| Q | 2 | Zn, PEG, In2(SO4)3, KOH [Prior Art] | 1.60 | | 16.75 | | 1.34 | | 14.94 | | 2.9 | 1.1 |
| R | 1 | Zn, KOH, PEG, In2(SO4)3 | 1.59 | −1% | 18.44 | 10% | 1.37 | 2% | 15.33 | 3% | 3.6 | 2.4 |
| S | 2 | Zn, KOH, PEG, In2O3 | 1.72 | 8% | 19.41 | 16% | 1.42 | 6% | 17.11 | 15% | 2.1 | 3.4 |
| T | 2 | Zn, KOH, PEG, In(OH)3 | 1.66 | 4% | 17.96 | 7% | 1.37 | 2% | 16.15 | 8% | 1.8 | 3.7 |
| U | 1 | Zn, PEG, In2(SO4)3 (0.02% In to Zn), KOH, In2O3 (0.08% In to Zn) | 1.61 | 1% | 19.71 | 18% | 1.32 | −1% | 15.64 | 5% | 7.9 | 3.6 |
| V | 1 | Zn, PEG, In2(SO4)3 (0.05% In to Zn), KOH, In2O3 (0.05% In to Zn) | 1.58 | −1% | 19.01 | 13% | 1.27 | −5% | 15.01 | 0% | 5.2 | 3.1 |

TABLE 4

Zinc-aluminum-bismuth-indium alloy

| Anode Design | No. of trials | Order of addition of Zn, PEG, indium compound and electrolyte (KOH) | Performance Test 1 | | | | Performance Test 2 | | | | Gassing Test 1 Average ml | Gassing Test 2 Average ml |
|---|---|---|---|---|---|---|---|---|---|---|---|---|
| | | | Cycle 1 Ah | % vs Control- | Cycle 25 Cumulative Ah | % vs Control | Cycle 1 Ah | % vs Control- | Cycle 25 Cumulative Ah | % vs Control | | |
| W | 1 | Zn, PEG, In2(SO4)3, KOH [Prior Art] | 1.50 | | 16.85 | | 1.27 | | 13.61 | | 1.6 | 1.8 |
| X | 1 | Zn, KOH, PEG, In2(SO4)3 | 1.47 | −2% | 18.00 | 7% | 1.29 | 2% | 14.52 | 7% | 1.8 | 1.9 |
| Y | 1 | Zn, PEG, In2(SO4)3 (0.016% In to Zn), KOH, In2(SO4)3 (0.064% In to Zn) | 1.62 | 8% | 16.59 | −2% | 1.34 | 6% | 14.27 | 5% | 2.0 | 2.9 |
| Z | 1 | Zn, PEG, In2(SO4)3 (0.016% In to Zn), KOH, In2O3 (0.064% In to Zn) | 1.55 | 3% | 18.41 | 9% | 1.34 | 6% | 14.45 | 6% | 4.8 | 1.1 |

TABLE 5

Lead-free zinc-bismuth alloy w/nucleation agents as anode additive

| Anode Design | No. of trials | Order of addition of Zn, PEG, indium compound and electrolyte (KOH) | Performance Test 1 | | | | Performance Test 2 | | | | Gassing Test 1 Average ml | Gassing Test 2 Average ml |
|---|---|---|---|---|---|---|---|---|---|---|---|---|
| | | | Cycle 1 Ah | % vs Control- | Cycle 25 Cumulative Ah | % vs Control | Cycle 1 Ah | % vs Control- | Cycle 25 Cumulative Ah | % vs Control | | |
| A | 9 | Zn, PEG, In2(SO4)3, KOH [Prior Art] | 1.57 | | 18.97 | | 1.24 | | 15.40 | | 1.8 | 2.5 |
| B | 6 | Zn, KOH, PEG, In2(SO4)3 | 1.58 | 1% | 19.20 | 1% | 1.35 | 9% | 16.23 | 5% | 1.9 | 2.0 |
| D | 4 | Zn, KOH, PEG, In2O3 | 1.70 | 8% | 21.49 | 13% | 1.31 | 6% | 16.60 | 8% | 7.2 | 3.7 |
| BB | 1 | Zn, KOH, PEG, In(SO4)3, 0.5% MgO | 1.58 | 1% | 19.51 | 3% | 1.14 | −8% | 15.17 | −1% | 0.7 | 1.8 |
| BC | 2 | Zn, KOH, PEG, In(SO4)3, 1% MgO | 1.43 | −9% | 19.89 | 5% | 1.24 | 0% | 16.36 | 6% | 1.1 | 0.6 |
| DD | 1 | Zn, KOH, PEG, In2O3, 0.05% MgO | 1.51 | −4% | 21.83 | 15% | 1.36 | 10% | 18.91 | 23% | 0.9 | 1.6 |
| BE | 1 | Zn, KOH, PEG, In(SO4)3, 0.05% CaO | 1.56 | −1% | 18.85 | −1% | 1.37 | 10% | 17.08 | 11% | 1.2 | 1.4 |
| DF | 1 | Zn, KOH, PEG, In2O3, 0.05% CaO | 1.69 | 8% | 21.16 | 12% | 1.40 | 13% | 17.43 | 13% | 3.3 | 3.6 |
| BG | 1 | Zn, KOH, PEG, In(SO4)3, 0.05% Ca(OH)2 | 1.54 | −2% | 19.64 | 4% | 1.33 | 7% | 16.59 | 8% | 1.2 | 2.0 |
| BH | 1 | Zn, KOH, PEG, In(SO4)3, 0.5% Ca(OH)2 | 1.62 | 3% | 19.40 | 2% | 1.38 | 11% | 17.12 | 11% | 1.5 | 1.9 |

The invention claimed is:

1. A rechargeable cell that performs at least twenty-five discharge and charge cycles comprising:
   a cathode having an electrochemically active powder including an oxide of manganese;
   an anode comprising an anode composition, said anode composition comprising an electrochemically active zinc alloy powder, wherein said composition is manufactured by a method comprising the step of mixing said zinc alloy with an alkaline electrolyte solution, an organic surfactant, an indium compound, and a gelling agent, such that said indium compound is added in an alkaline environment and wherein the organic surfactant is added after the alkaline electrolyte;
   a separator including at least one semipermeable membrane;
   and an electrolyte solution in the separator, the cathode and the anode, and filling pores thereof.

2. The rechargeable cell of claim 1, wherein said indium compound is comprised of a first indium compound and a second indium compound.

3. The rechargeable cell of claim 2, wherein said first and second indium compound is selected from the group consisting of indium sulfate solution, indium sulfate powder, indium oxide solution, indium oxide powder, indium hydroxide solution, indium hydroxide powder, indium acetate solution, and indium acetate powder and any combination thereof.

4. The rechargeable cell of claim 2, wherein the indium compound makes up from about 0.05 to about 0.5% by weight of the electrochemically active zinc.

5. The rechargeable cell of claim 1, wherein said anode composition further comprises a nucleation additive selected from the group consisting of magnesium oxide, magnesium hydroxide, calcium oxide, calcium hydroxide, zirconium oxide, or any combination thereof.

6. The rechargeable cell of claim 5, wherein said nucleation additive is present up to 2.5% by weight of the anode.

7. The rechargeable cell of claim 1, wherein said electrochemically active zinc material comprises a metallic zinc or a zinc alloy.

8. The rechargeable cell of claim 1, wherein said organic surfactant is present in the range of from about 0.1% to about 0.25% by weight of said electrochemically active zinc material.

9. The rechargeable cell of claim 1, wherein said alkaline electrolyte comprises an aqueous solution of potassium hydroxide having a concentration of about 5.5 molar to about 12 molar.

10. The rechargeable cell of claim 9, wherein said electrolyte is added in a first and second portion.

11. The rechargeable cell of claim 10, wherein said first portion of said electrolyte is about 100% of total volume of electrolyte.

12. The rechargeable cell of claim 10, wherein said first portion of said electrolyte is between about 20% and about 60% of total electrolyte volume.

13. The rechargeable cell of claim 12, wherein said first portion of said electrolyte is about 40% of total volume of said electrolyte.

14. A rechargeable cell that performs at least twenty-five discharge and charge cycles comprising:
   a cathode having an electrochemically active powder including an oxide of manganese;
   an anode comprising an anode composition, said anode composition comprising an electrochemically active zinc material, wherein said composition is manufactured by a method comprising the steps of:
   mixing said zinc material with an organic surfactant;
   mixing said zinc material with a first indium compound;
   mixing said zinc material with a first portion of an alkaline electrolyte;
   mixing said zinc material with a second indium compound; and
   mixing said zinc material with a second portion of said electrolyte and a gelling agent, wherein the organic surfactant is add after the alkaline electrolyte and
   wherein the first indium compound and the second indium compound are added in an alkaline environment;
   a separator including at least one semipermeable membrane;
   and an electrolyte solution in the separator, the cathode and the anode, and filling pores thereof.

15. The rechargeable cell of claim 14, wherein said first and second indium compound is selected from the group consisting of indium sulfate solution, indium sulfate powder, indium oxide solution, indium oxide powder, indium hydroxide solution, indium hydroxide powder, indium acetate solution, and indium acetate powder and any combination thereof.

16. The rechargeable cell of claim 15, wherein said first and second indium compound make up from about 0.05 to about 0.5% by weight of the electrochemically active zinc.

17. The rechargeable cell of claim 14, wherein said anode composition further comprises a nucleation additive selected from the group consisting of magnesium oxide, magnesium hydroxide, calcium oxide, calcium hydroxide, zirconium oxide, or any combination thereof.

18. The rechargeable cell of claim 17, wherein said nucleation additive is present up to 2.5% by weight of the anode.

19. The rechargeable cell of claim 14, wherein said electrochemically active zinc material comprises a metallic zinc or a zinc alloy.

20. The rechargeable cell of claim 14, wherein said organic surfactant is present in the range of from about 0.1% to about 0.25% by weight of said electrochemically active zinc material.

21. The rechargeable cell of claim 14, wherein said alkaline electrolyte comprises an aqueous solution of potassium hydroxide having a concentration of about 5.5 molar to about 12 molar.

22. The rechargeable cell of claim 21, wherein said first portion of said electrolyte is about 100% of total volume of electrolyte.

23. The rechargeable cell of claim 21, wherein said first portion of said electrolyte is between about 20% and about 60% of total electrolyte volume.

24. The rechargeable cell of claim 23, wherein said first portion of said electrolyte is about 40% of total volume of said electrolyte.

* * * * *